Figure 1:
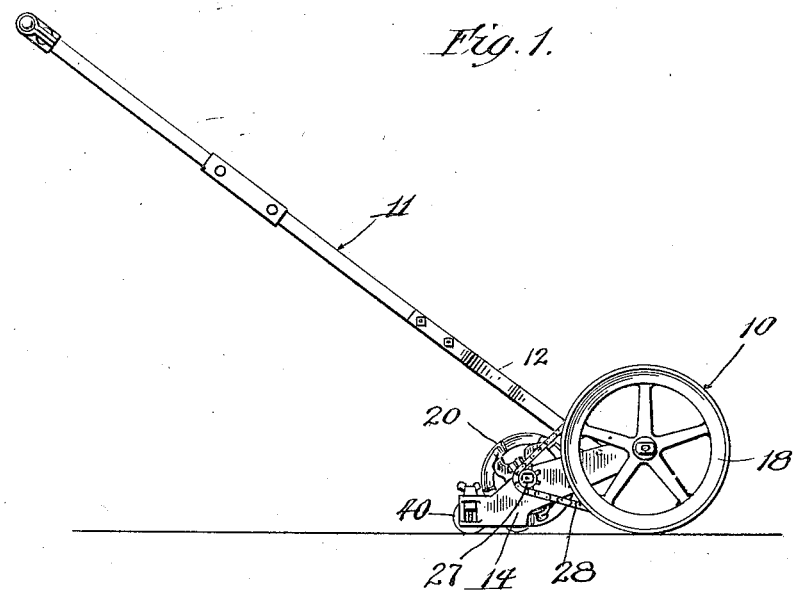

June 3, 1924.

G. R. RICH

LAWN MOWER

Filed Feb. 15, 1922

1,496,128

3 Sheets-Sheet 1

Inventor:
George R. Rich,
by his Atty

June 3, 1924. 1,496,128

G. R. RICH

LAWN MOWER

Filed Feb. 15, 1922 3 Sheets-Sheet 2

Inventor:
George R. Rich,
by Charles O. Shurey
his Atty.

June 3, 1924.
G. R. RICH
LAWN MOWER
Filed Feb. 15, 1922      3 Sheets-Sheet 3
1,496,128
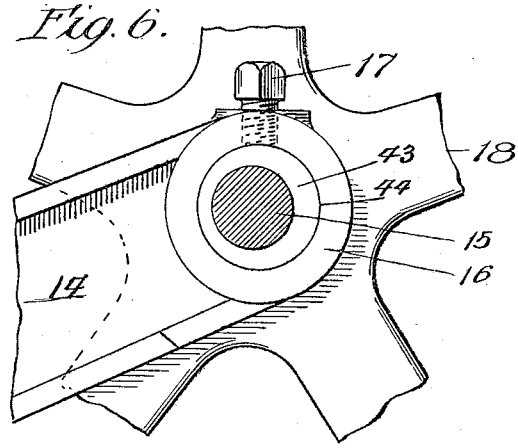
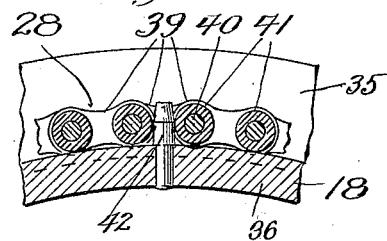
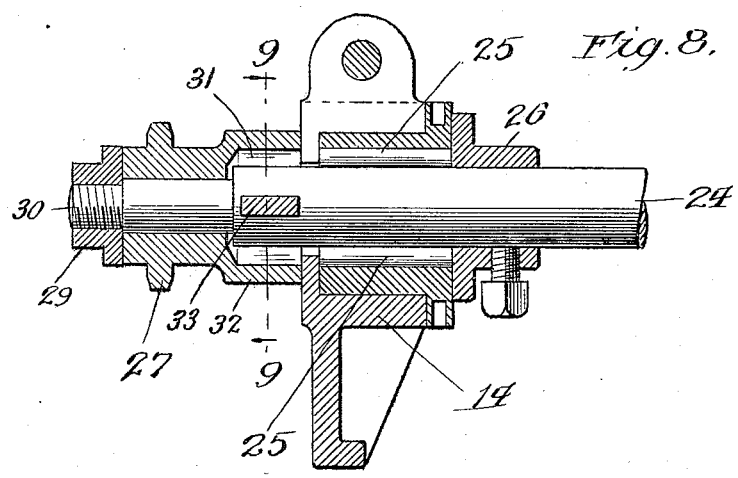
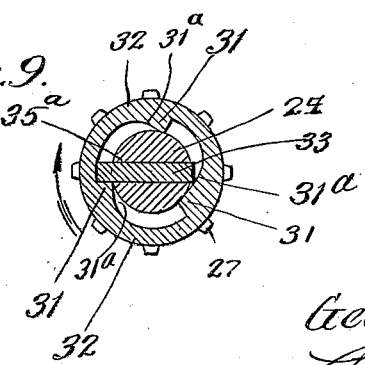
Inventor:
George R. Rich,
by Charles O. Hervey
his Atty.

Patented June 3, 1924.

1,496,128

UNITED STATES PATENT OFFICE.

GEORGE R. RICH, OF LOS ANGELES, CALIFORNIA, ASSIGNOR TO RICH STEEL PRODUCTS COMPANY, OF VERNON, CALIFORNIA, A CORPORATION OF CALIFORNIA.

LAWN MOWER.

Application filed February 15, 1922. Serial No. 536,693.

*To all whom it may concern:*

Be it known that I, GEORGE R. RICH, a citizen of the United States, and a resident of Los Angeles, Los Angeles County, and State of California, have invented certain new and useful Improvements in Lawn Mowers, of which the following is declared to be a full, clear, and exact description.

This invention relates to lawn mowers, and more particularly to the drive mechanism for the cutter heads of lawn mowers. One of the principal objects of this invention is to increase the speed of the cutter head without necessarily increasing the power required for operating it. Another object is to reduce friction in lawn mowers, and thereby reduce the power required to propel the same and operate the cutter head. Another object is to provide simple and novel adjustment mechanism for taking up wear on the drive mechanism. Another object is to eliminate the noise and vibration usually present in lawn mowers. Another object is to simplify and yet increase the efficiency of lawn mowers, to reduce weight, and to reduce to a minimum the number of its parts.

With these and other objects and advantages in view, this invention consists in the several novel features hereinafter fully set forth and particularly defined in the claims.

Figure 2:
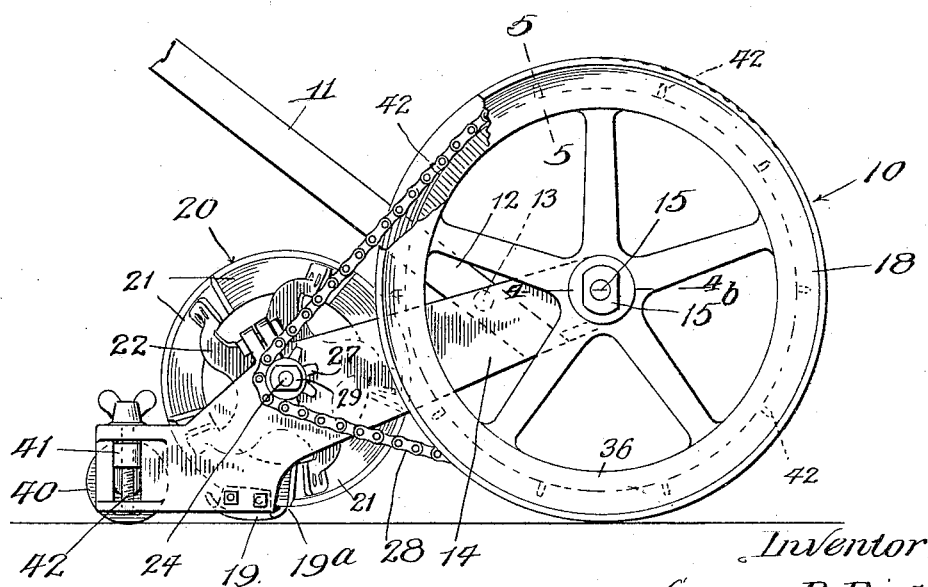
Figure 3:
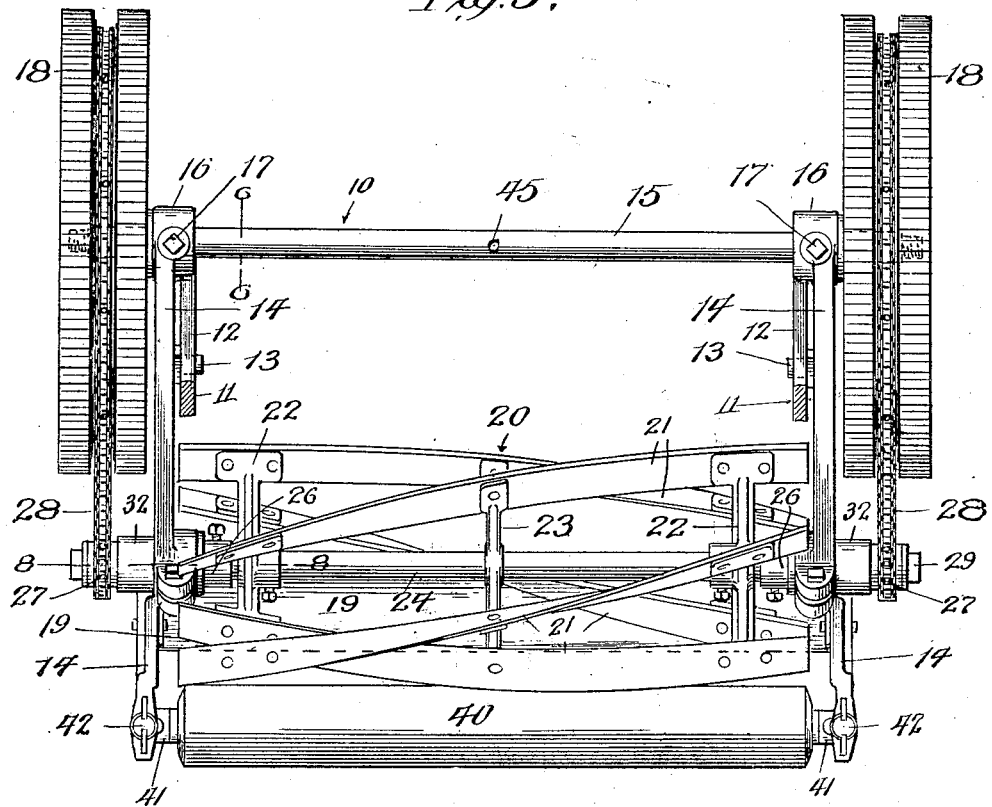
Figure 4:
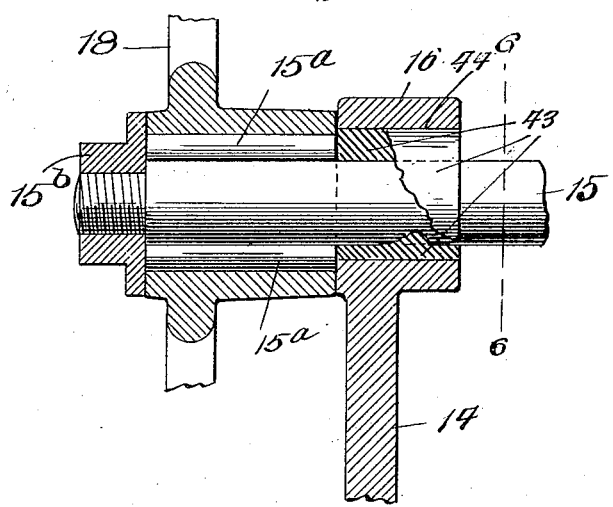
Figure 5:
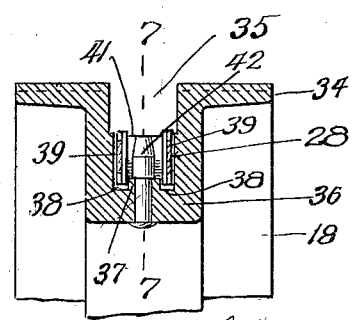

The invention is clearly illustrated in the drawings accompanying this specification, in which:

Fig. 1 is a side elevation of a lawn mower, embodying a simple form of the present invention; Fig. 2 is a side elevation thereof, upon a larger scale, with the handle thereof partly broken away; Fig. 3 is a plan of the parts seen in Fig. 2; Fig. 4 is a detail, vertical cross-section taken on line 4—4 of Fig. 2; Fig. 5 is a detail section taken on line 5—5 of Fig. 2; Fig. 6 is a view partly in side elevation and partly in vertical section, illustrating a certain adjustment device for the driving mechanism, the line of section being indicated at 6—6 of Fig. 4; Fig. 7 is a detail vertical section taken on line 7—7 in Fig. 5; Fig. 8 is a detail, vertical section taken on line 8—8 of Fig. 3, and Fig. 9 is a detail, vertical section taken on line 9—9 of Fig. 8. Figs. 4 to 9, inclusive, show the parts on a full size scale.

Referring to said drawings, the reference character 10 designates the head of a lawn mower, embodying a simple form of the present invention, and 11 designates the handle, which is provided with a forked part 12, that is pivotally connected to the head 10 on lugs 13, that project laterally from the side frame members 14 thereof. The mower head 10 is pushed forward and drawn backward by the handle 11, in cutting the grass, as is well understood.

The side frame members 14 are suitably spaced apart, and are rigidly tied together at their forward ends by a rod 15, which extends transversely of the head 10, and is secured in bosses 16, formed on the forward ends of the side frame members 14, by set screws 17, that are threaded in the bosses and bear against the rod 15. Said rod 15 also acts as a support for the traction or drive wheels 18 of the mower. The rear ends of the side frame members 14 are tied together by a knife bar 19, which is bolted or otherwise securely fastened to the side frame members. The rod 15 projects beyond the side frame members, and the traction wheels 18 are rotatively mounted on said projecting ends of the rod. Preferably, roller bearings 15$^a$ are provided between the rod and traction wheels, and nuts 15$^b$ threaded on the ends of the rod 15 hold the wheels thereon. The traction wheels support the front end of the frame and its rear end is supported by a roller 40, which is rotatively mounted on brackets 41, adjustably secured in the rear end of the side frame members by adjustment screws 42.

Behind the traction wheels 18 is located the cutter head 20, which comprises a plurality of blades 21, of the usual spiral form, which are secured to blade supporting spiders 22, 23, the end ones 22 of which are secured to a shaft 24. The blades 21 cooperate with the stationary knife bar 19, to cut the grass, as the mower is propelled along the same. The forward edge portion 19$^a$ of the knife bar 19 is curved upward and presents a cutting edge that co-operates with the cutting edges of the blades 21, as is well understood.

The shaft 24 is journalled in the bearings 25 located in the side frame members 14, and as a preference, said bearings are of the roller bearing type. Collars 26 secured on the shaft 24, adjacent the side frame members 14 by set screws, are arranged to take up any end thrust on the shaft 24. Said shaft 24 projects beyond the side frame members 14, and has sprocket wheels 27 thereon, one on each end, which sprocket wheels are connected to the traction or drive wheels 18 by sprocket chains 28, as will be presently described. The sprocket wheels 27 are held on the shaft 24 by nuts 29, secured upon the reduced threaded ends 30 thereof. The sprocket wheels 27 and shaft 24 are connected by pawl and ratchet mechanism, whereby the mower head may be moved backward without affecting the cutter head, and whereby also the cutter head may rotate independently of the traction wheels.

Conveniently, the pawl and ratchet mechanism may comprise internal ratchet teeth 31, formed on the internal face of an extended hub portion 32 of the sprocket wheel, and a pawl 33 slidably secured in the shaft 24, and arranged to engage with said ratchet teeth. The pawl 33 is in the form of a short pin or bar and is slidably held in a transverse slot 35ª in the shaft. Cam-like faces 31ª opposite the teeth (see Fig. 9) are provided for engaging the pawl with an opposing tooth, when the sprocket wheel is rotated in the proper direction. Said cam faces also act to disengage the pawl from the teeth when the sprocket wheel is rotated in a reverse direction, or when the cutter head rotates independently of the traction wheels in one direction. It will be observed from an examination of Fig. 9, that if the sprocket wheel 27 is rotated in the direction of the arrow, the tooth 31 engaging the pawl 33 will cause rotation of said pawl, and therewith the shaft 24, and consequently, rotation of the cutter head attached to the shaft, and that if the sprocket wheel is rotated in the reverse direction, the tooth will move away from the pawl, and as the cam face 31ª engages the end of the pawl which protrudes from the shaft, it will force that end of the pawl into the shaft and force the other end out of the shaft into the deep space adjacent a tooth 31, without, however, causing rotation of the shaft. Likewise, if the shaft rotates in the direction of the arrow, independently of the sprocket wheel, the cam faces 31ª will disengage the pawl from the teeth 31, thus permitting the shaft to rotate freely and independently of the sprocket wheel in the direction which does the cutting.

The tread faces of the traction or drive wheels 18 may be serrated transversely, as is customary, to give increased traction effect, or they may be provided with any of the well known surface gripping means. The rim 34 of each traction wheel is formed with an annular deep groove 35, intermediate its side edges (see Figs. 5 and 7) for the reception of the drive chain 28, and, conveniently, said groove is formed by casting a thin annular U shaped web 36 on the inner side of the rim. An annular rib 37 is formed on the bottom of the groove 35, which rib is narrower than the groove, and has a shollow annular groove 38 formed on each side of it. The drive chain 28 is preferably formed of links 39, connected by pins 40 around which are rollers 41. The rollers 41 engage with the rib 37, while the links 39 enter the grooves 38 at the sides thereof, whereby friction between the chain and drive wheel is reduced to a minimum. At widely spaced intervals, sprocket teeth 42, in the form of pins or studs, are secured on the bottom of the groove 35, and engage with the drive chain. Said pins are preferably formed with stems, which extend through the web 36 and are up set on the outer side thereof.

To take up any unnecessary slack that may occur in the chains, I have provided simple and effective tightening means, which will now be described. On the rod 15, are secured eccentric blocks or bushings 43 (see Figs. 4 and 6) which are contained in apertures 44 formed in the bosses 16 of the side frame members 14. The set screws 17, before referred to, bear against the eccentric blocks or bushings, 43, and securely fasten them and the rod 15 in place. The rod 15 has a hole 45 (see Fig. 3) formed therein, into which a pin, nail or similar article may be inserted, to act as a lever, and by loosening the set screws 17 and moving said pin, the eccentric blocks may be partially rotated in the apertures of the bosses 16, to thereby move the rod 15 and the drive wheels 18 carried thereby away from the sprocket wheels 27, and thereby tighten the drive chains 28. By tightening the set screws 17, the rod 15 is securely fastened in any position of adjustment. As a convenience in construction and for the purpose of economy, the eccentric blocks 43 may be spot welded to the rod 15, although they may be pinned thereto, if desired, or may be formed integral therewith.

In the operation of the mower, it is propelled along the grass as is well understood. The drive chains 28 rotate the sprocket wheels 27 at a high rate of speed as compared with that of the traction wheels, and the cutter head is thereby rotated at high speed. Consequently, the grass is cut more evenly, and less force is required to do the cutting. The ratchet mechanism between the sprocket wheels 27 and cutter head shaft 24 permits the latter, with its cutter head, to rotate independently of the sprocket wheels by the momentum acquired, and permits the mower to be drawn backward without interfering with the rotation of the cutter head.

The particular advantage obtained by locating the drive chains between the side edges of the traction wheels is, that the width of the machine need not be increased unnecessarily and by placing the drive chains in the deep grooves in the traction wheels, there is less danger of foreign matter collecting thereon. With this drive mechanism, it is possible to obtain a high ratio of gearing without increasing the power to operate the mower, beyond that required in spur gear driven mowers of less gear ratio. Greater uniformity in the cutting action of the blades is therefore obtained, there is a more positive cutting action and the grass is therefore cut even in length. Practically all noise usually present in lawn mowers is eliminated.

The cutter head is made adjustable toward the knife bar by novel means, which is fully set forth and claimed in a co-pending application filed by me on even date herewith and designated by the Serial No. 536694.

More or less variation of the exact details of construction is possible without departing from the spirit of this invention; I desire, therefore, not to limit myself to the exact form of the construction shown and described, but intend in the following claims, to point all of the invention disclosed herein.

I claim as new and desire to secure by Letters Patent:

1. In a lawn mower, the combination with side frame members, a knife bar rigidly connecting said side frame members at one end, a stationary rod extending through the other end thereof and means for rigidly securing said side frame members and rod together, of a cutter head rotatively mounted on said side frame members, sprocket wheels operatively connected with said cutter head, traction wheels rotatively mounted on said rod, and drive chains trained over said sprocket wheels and traction wheels, said rod having eccentric sleeve portions thereon mounted in said side frame members capable of being turned therein for tightening said drive chains on the sprockets and traction wheels.

2. In a lawn mower, the combination with side frame members, a knife bar rigidly connecting said side frame members at one end, a stationary rod extending through the other end thereof and means for rigidly securing said side frame members and rod together, of a cutter head rotatively mounted on said side frame members, sprocket wheels operatively connected with said cutter head, traction wheels rotatively mounted on said rod, and drive chains trained over said sprocket wheels and traction wheels, said rod having eccentric blocks permanently secured thereon and mounted in said side frame members and capable of being turned therein for tightening said drive chains on the sprockets and traction wheels.

3. In a lawn mower, a frame, traction wheels and a cutter head rotatively mounted thereon, drive mechanism for said cutter head including drive chains trained over said drive wheels, and eccentric adjustment blocks for said drive wheels, whereby the latter may be moved bodily to tighten the drive chains thereon.

GEORGE R. RICH.